(12) United States Patent
Burger

(10) Patent No.: US 10,970,295 B2
(45) Date of Patent: Apr. 6, 2021

(54) COLLECTING STATISTICS IN UNCONVENTIONAL DATABASE ENVIRONMENTS

(71) Applicant: Teradata US, Inc., Dayton, OH (US)

(72) Inventor: Louis Martin Burger, Escondido, CA (US)

(73) Assignee: Teradata US, Inc., San Diego, CA (US)

( * ) Notice: Subject to any disclaimer, the term of this patent is extended or adjusted under 35 U.S.C. 154(b) by 170 days.

(21) Appl. No.: 15/257,507

(22) Filed: Sep. 6, 2016

(65) Prior Publication Data

US 2017/0068710 A1 Mar. 9, 2017

Related U.S. Application Data

(60) Provisional application No. 62/214,064, filed on Sep. 3, 2015.

(51) Int. Cl.
*G06F 16/00* (2019.01)
*G06F 16/2458* (2019.01)
*G06F 16/2453* (2019.01)
*G06F 16/28* (2019.01)
*G06F 16/21* (2019.01)

(52) U.S. Cl.
CPC ........ *G06F 16/2465* (2019.01); *G06F 16/217* (2019.01); *G06F 16/24542* (2019.01); *G06F 16/28* (2019.01)

(58) Field of Classification Search
CPC ......... G06F 17/30539; G06F 17/30463; G06F 16/24542; G06F 16/21; G06F 16/2465; G06F 16/28; G06F 16/217
See application file for complete search history.

(56) References Cited

U.S. PATENT DOCUMENTS

| 8,229,917 B1 * | 7/2012 | Aneas | G06F 17/30469 |
| | | | 707/713 |
| 9,576,007 B1 * | 2/2017 | Sivathanu | G06F 17/30321 |
| 2005/0149505 A1 * | 7/2005 | Bossman | G06F 17/30306 |

(Continued)

OTHER PUBLICATIONS

Bruno et al., "Recurring Job Optimization for Massively Distributed Query Processing", 2013, IEEE, pp. 46-55.*

*Primary Examiner* — Leslie Wong
(74) *Attorney, Agent, or Firm* — Ramin Mahboubian

(57) ABSTRACT

A system and method for determining optimal query plans within a distributed processing system. The system includes a query optimizer for receiving a query and generating a query plan for execution by the distributed processing system; a repository including statistics related to prior executed query plans; a plan execution engine for receiving and executing the query plan, collecting statistics corresponding to the query plan, and storing the statistics and optimizer usage metadata corresponding to the query plan and prior executed query plans in the repository. The system further includes a statistics advisory tool for mining the metadata to generate a collection of histogram statistics and storing said histogram statistics in the repository. When generating a query plan, the query optimizer searches the statistics repository for statistics, including histogram statistics, useful to the generation of the current query plan and uses selected statistics from the repository to generate the query plan.

18 Claims, 4 Drawing Sheets

(56) References Cited

U.S. PATENT DOCUMENTS

| | | | |
|---|---|---|---|
| 2005/0234900 A1* | 10/2005 | Bossman | G06F 17/30306 |
| 2006/0031189 A1* | 2/2006 | Muras | G06F 17/30433 |
| 2006/0212264 A1* | 9/2006 | Barsness | G06F 16/24549 |
| | | | 702/182 |
| 2007/0130107 A1* | 6/2007 | Waas | G06F 16/2462 |
| 2009/0018992 A1* | 1/2009 | Zuzarte | G06F 16/2453 |
| 2009/0030875 A1* | 1/2009 | Bossman | G06F 17/30306 |
| 2009/0276394 A1* | 11/2009 | Bestgen | G06F 16/24542 |
| 2010/0106708 A1* | 4/2010 | Burger | G06F 17/30474 |
| | | | 707/713 |
| 2014/0095472 A1* | 4/2014 | Lee | G06F 17/30466 |
| | | | 707/714 |

* cited by examiner

COLLECTING STATISTICS IN UNCONVENTIONAL DATABASE ENVIRONMENTS

CROSS REFERENCE TO RELATED APPLICATIONS

This application claims priority under 35 U.S.C. § 119(e) to the following commonly-assigned patent application, which is incorporated herein by reference:

Provisional Patent Application Ser. No. 62/214,064, entitled "COLLECTING STATISTICS IN UNCONVENTIONAL DATABASE ENVIRONMENTS," filed on Sep. 3, 2015, by Louis Burger.

FIELD OF THE INVENTION

The present invention relates to distributed processing of vary large data sets on computer clusters, and more particularly, to an improved system and method for statistics collection and query optimization in a Hadoop MapReduce software framework.

BACKGROUND OF THE INVENTION

FIG. 1 shows a Hive data warehousing infrastructure 110 built on top of a Hadoop cluster 120. The Hive infrastructure shown includes a Hive Server 111, a MapReduce compiler 113, an optimizer 115, and execution engine 117, and other components. The Hadoop cluster employs a MapReduce model 121 to manage distributed storage 123 and distributed processing of very large data sets.

Using a Hive command line interface (CLI) 105, a Web interface 107, or a Hive JDBC/ODBC client 109, a user 101 submits a Hive query 103 to the HiveServer 111, which is compiled, optimized and planned as a MapReduce job. The resultant MapReduce job is executed on Hadoop cluster 120.

Software frameworks, such as the framework illustrated in FIG. 1, and others built around the MapReduce programming model, have recently introduced high level scripting languages that can provide a simplified abstraction of distributed computing environments along with varying levels of automatic optimization. Prominent examples of such scripting languages include Hive, Pig and SCOPE.

As with traditional relational database systems, these new optimizers are increasingly moving towards cost-based optimization methods whose plan operator selectivity estimations require statistics describing the properties of the input data. Unfortunately, the inherent nature of the raw data in these environments, e.g., Hadoop environment, is not suitable for traditional statistics collection methods. One problem is that the unstructured nature of the data along with the fact that many of the operators involve user defined functions, make it difficult to maintain quality statistics.

In an attempt to overcome this problem, the designers of SCOPE have introduced a technique for gathering statistics during query execution and leveraging them in future executions of the same or similar jobs. See J. Zhou, P. A. Larson, and R. Chaiken. Incorporating partitioning and parallel plans into the SCOPE optimizer. In *Proceedings of ICDE Conference*, 2010; and N. Bruno, S. Jain, and J. Zhou. Recurring Job Optimization for Massively Distributed Query Processing. In *IEEE Data Engineering Bulletin*. 36(1): 46-55 (2013); incorporated by reference herein.

Although such statistics are generally better than no statistics at all, they can suffer from the significant problems as compared to traditional database statistics collected by a dedicated collection statement. For example, these problems can include:

1. The reliance on query collected statistics can be inherently, reactive, rather than proactive, approach to statistics refreshing. At least one occurrence of a job (query) can suffer from out of date statistics before correcting the issue for subsequent occurrences.
2. The category of statistics that can reasonably be collected may be limited to simple summary statistics such as row counts and average row size. In MapReduce execution environments, many of the intermediate results passed between plan operators are streamed rather than materialized into spools and associated statistics are captured. via simple increment methods. Such methods are not capable of generating complex statistic structures such as histograms that describe value distribution in detail.
3. The gathered statistics may not be general purpose for use by a variety of other job occurrences. Many query runtime data sets are the result of applying one or more parametric (constant) filters that were input to the job, As a result, the gathered statistics pertain specifically to a given set of parameter values which may not be repeated on subsequent job invocations.
4. Although the statistics collection overhead can be reportedly low, the fact that it is repeated for every job (query) occurrence can be wasteful in those environments where the frequency of query execution relative to the frequency of updates and data loads.

As such, it will be appreciated that query time collected statistics can be supplemented with separate dedicated collections (non-query) in those instances where detailed histograms are required for accurate optimization. In one embodiment, existing query based statistics collection and optimization methods, such as the techniques described in N. Bruno, S. Jain, and J. Zhou. Recurring Job Optimization for Massively Distributed Query Processing. In *IEEE Data Engineering Bulletin*. 36(1): 46-55 (2013), referenced above, can be extended to support both categories of statistics. Although the description is provided in the context of the SCOPE scripting language and its collection methods, those skilled in the art will readily appreciate that it can generally apply to virtually all similar scripting languages, including, for example, Hive and Pig. It will also be appreciated that the resulting "Hybrid" method can effectively leverage the strengths from both methods of statistics collection.

DETAILED DESCRIPTION OF THE INVENTION

The solution described below supplements existing query based statistics collection and optimization methods, with separate dedicated collections (non-query) in those instances where detailed histograms are required for accurate optimization.

Existing Operations in Query-Only Statistics Collection Method

Figure 1:
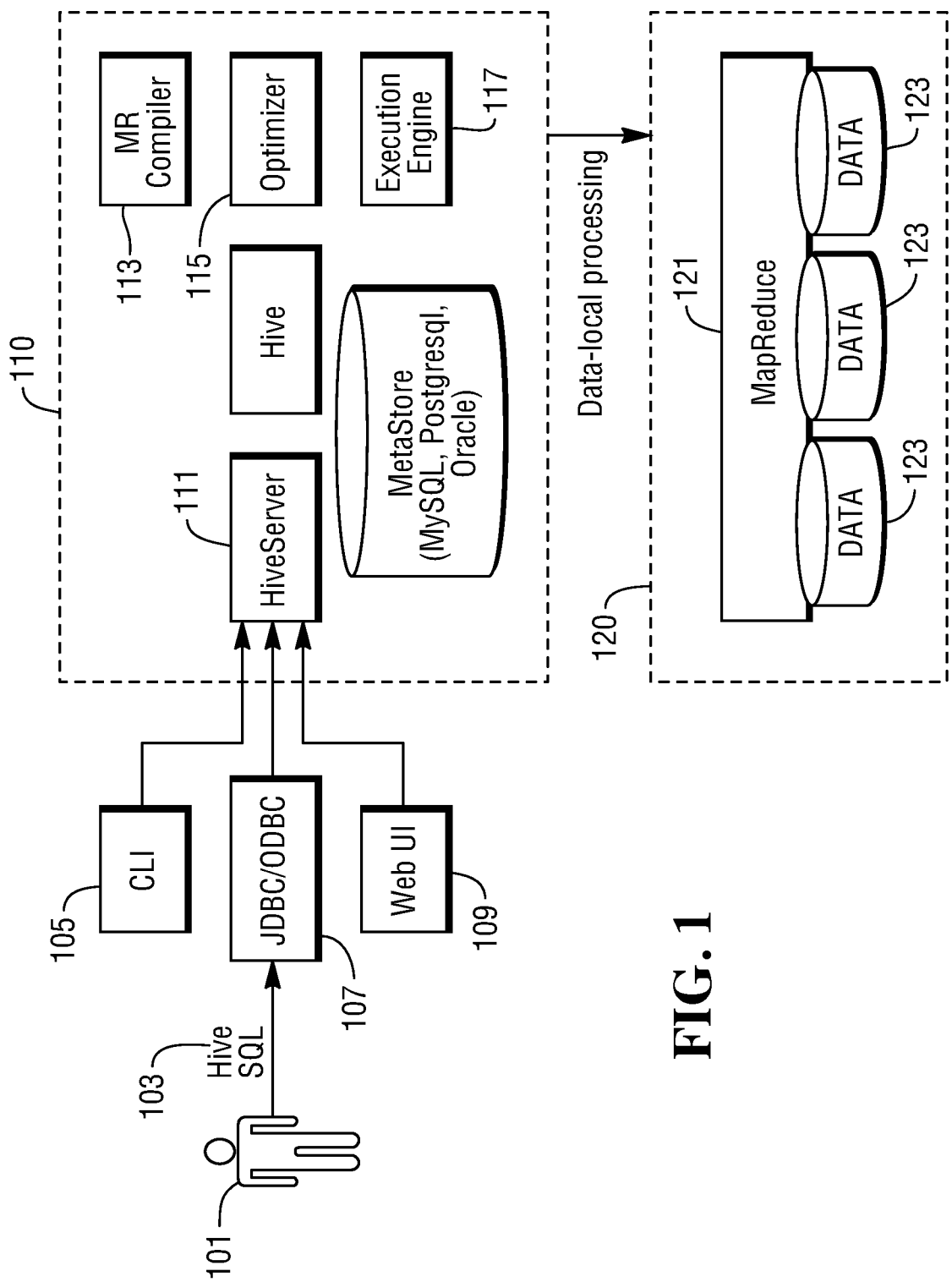
FIG. 1 provides a simple example of a Hive data warehousing infrastructure built on top of a Hadoop cluster.
Figure 2:
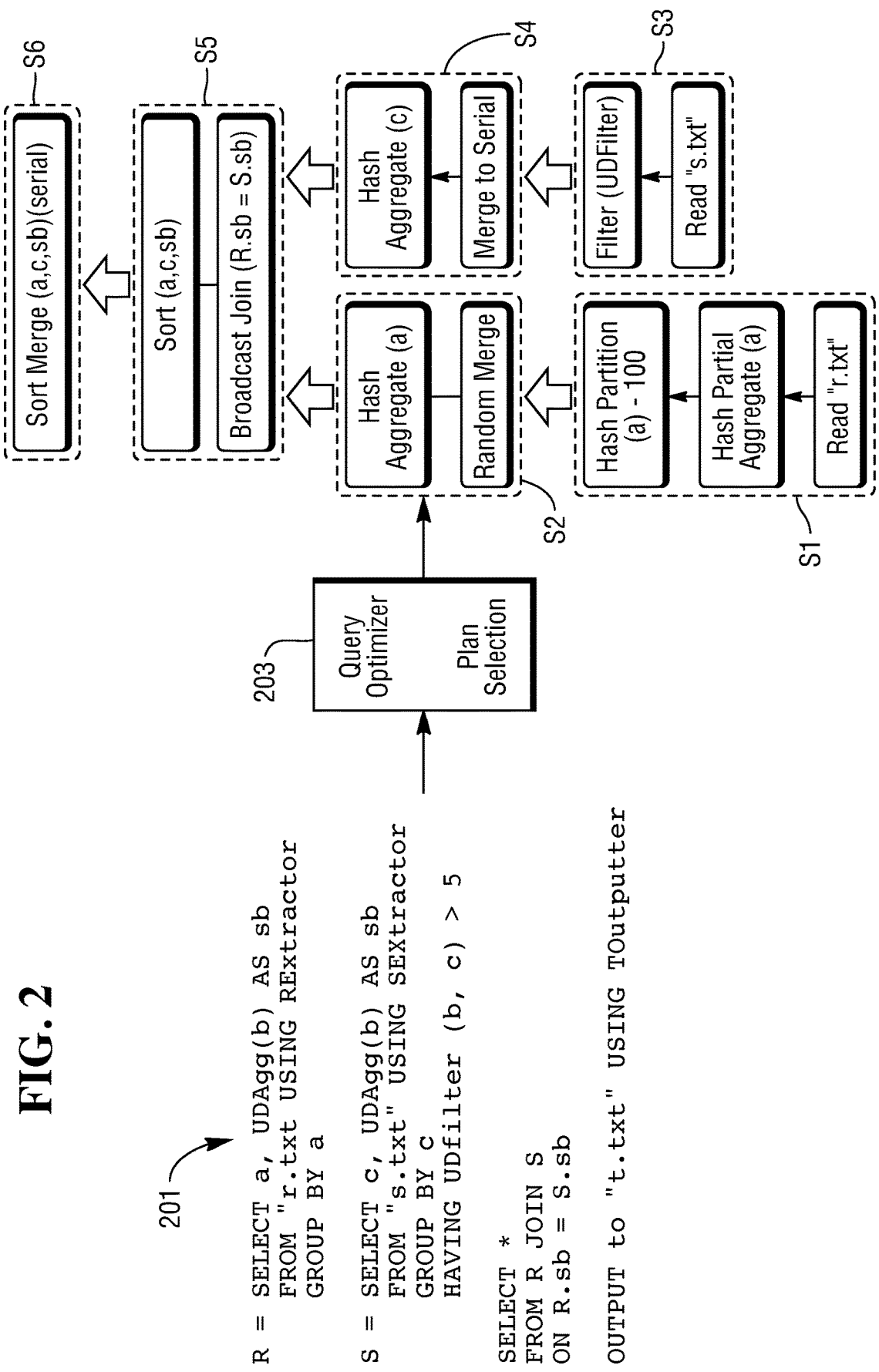
FIG. 2 shows a sample query submitted to a query optimizer and plan output from a query optimizer.

In a query-only statistics collection method, the scripting language's query optimizer generates "signatures" for each execution subtree it considers during plan selection, where a signature uniquely identifies a logical query fragment. Such subtrees or fragments are very similar to representations used by relational view matching methods in relational database SQL optimizers, such as Join Index (materialized view) matching used in database systems by Teradata Corporation. FIG. 2 shows a sample query 201 from a scripting language along with the plan output from a query optimizer 203, consisting of a tree of execution operators that have been organized into subtrees S1 through S6, each representing a different signature.

Figure 3:
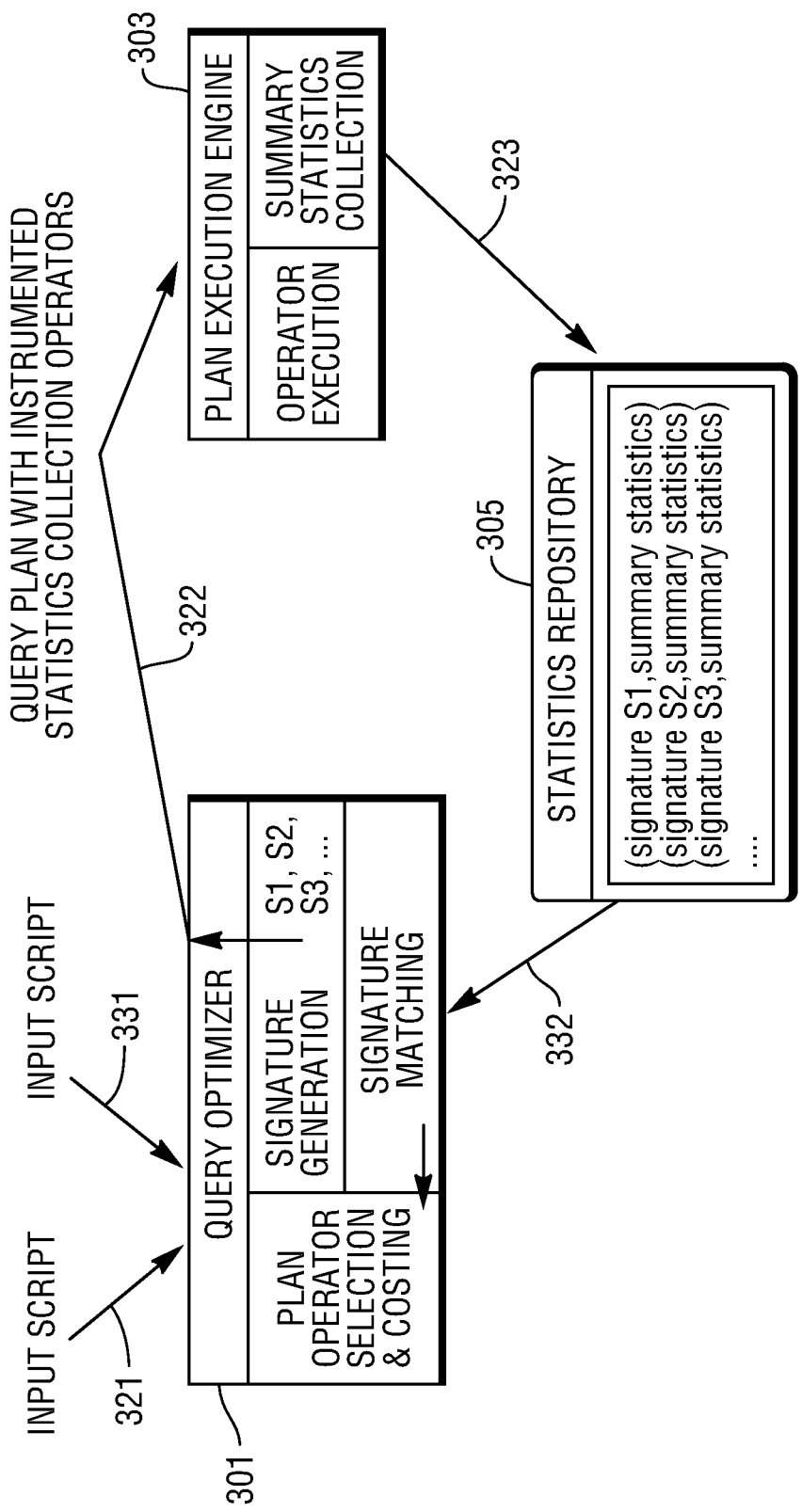
FIG. 3 illustrates a query-only statistics collection method employed by a query optimizer to aid in determining an execution plan for a query.

During query processing, the query optimizer instruments the chosen execution plan to collect statistics on interesting signatures and store them in a statistics repository after plan execution completes. Parameterized values are replaced with canonical values within the signature to make it more generic, although the underlying data the statistics describe is often parameter specific. If statistics already exist for a signature, the new statistics are merged with the existing signature, e.g., by last instance only or weighted average with aging. Operations 321 and 322 in FIG. 3 depict query optimizer 301 selecting and instrumenting a query plan to collect statistics for signatures S1, S2, and S3. Operation 323 depicts the runtime execution engine 303 performing those collections and storing the resulting statistics in repository 305 along with their identifying signature.

When estimating the selectivity (cardinality) of a plan subtree for a subsequent instance of the same or similar job, optimizer 301 probes statistics repository 305 for a match based on that subtree's signature. If a match is found, optimizer 301 fetches and uses the statistics to compute the estimation. Operation 331 in FIG. 3 depicts the optimization of a subsequent user input script which may or may not be the same as the prior input script in 321. Operation 332 depicts the optimizer searching the statistics repository for stored signatures that match subtrees considered during plan selection. If any of the current subtrees have a signature that matches S1, S2, or S3, the corresponding statistics are fetched and used for costing.

Hybrid Statistics Collection Method

In accordance with one aspect, additional Operations can be provided (in a new Hybrid Statistic Collection Method).

The statistics usage processing described above can be enhanced to identify and count how the query time collected statistics are used by the optimizer. More specifically, the statistics related data stored for each signature can be enhanced to maintain the following metadata and counts:

1. Number of optimizer usages that required only query collected statistics (NumSummaryOnly)
2. Number of optimizer usages that would have used detailed histograms had they been available along with the set of expressions or columns whose value distribution were needed (NumDetailed and SignatureProjectList). The selectivity of certain categories of query fragments is highly dependent on the value distribution of constant expressions which in turn can be accurately estimated if histograms are available on those expressions (e.g., UDFilter(t.a)>constant)
3. Average level of "aggressiveness" for the execution algorithms being considered for the relevant plan subtree (AvgAggression). Aggressive execution algorithms are those that are significantly more efficient but only in cases where their input data has properties within a very narrow range. For example, certain join and aggregation algorithms are efficient only when one input is small enough to fit entirely within memory/cache.

Figure 4:
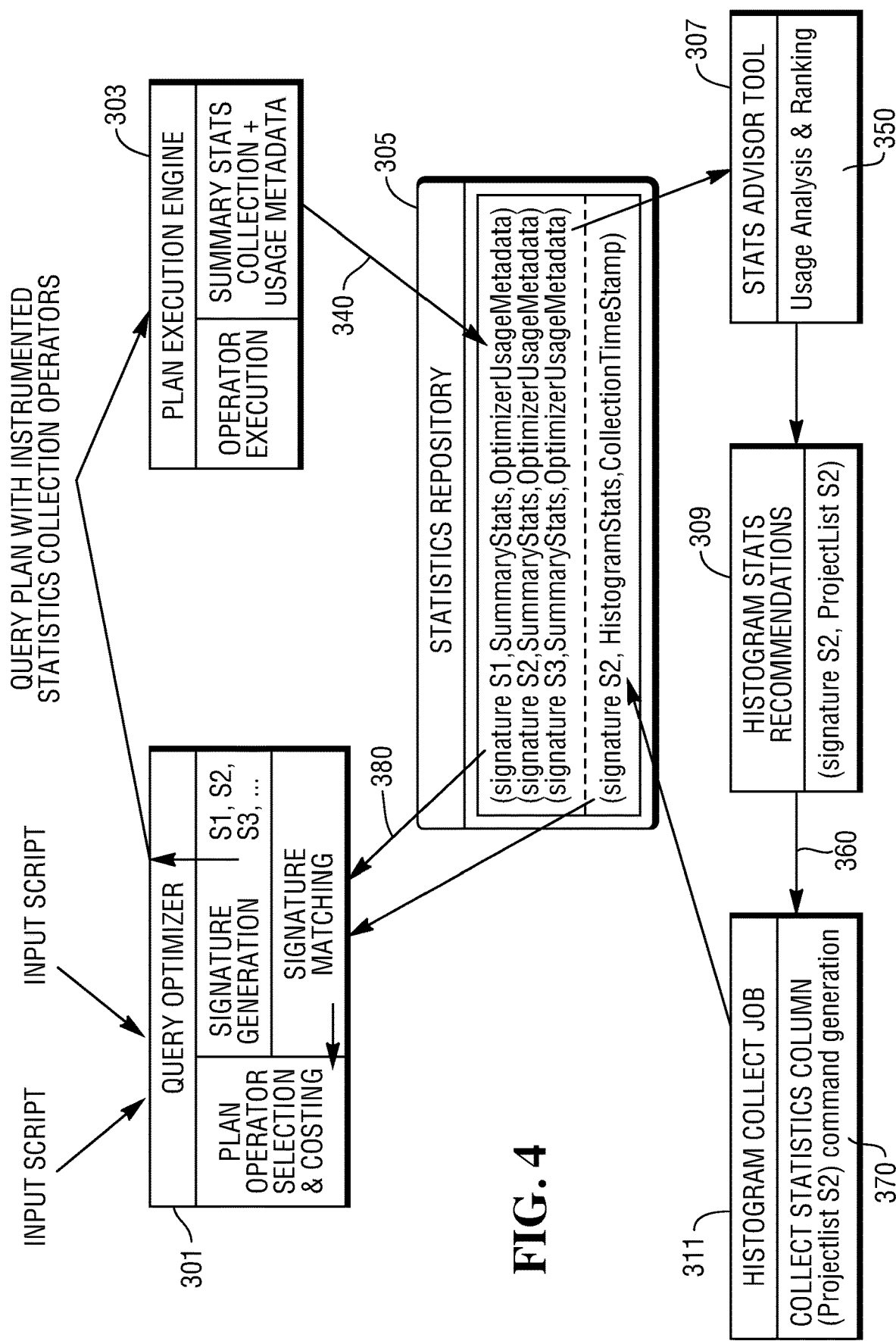
FIG. 4 illustrates an improved "hybrid" statistics collection method employed by a query optimizer to aid in determining an execution plan for a query in accordance with one embodiment of the present invention.

Operation 340 in FIG. 4 depicts the storage of optimizer usage metadata for signatures S1, S2, and S3.

In one embodiment, a statistics advisor tool 307 is introduced to periodically mine the metadata collected in operation 340, and identify those signatures whose optimization would greatly benefit from a separated dedicated collection of detailed histogram statistics on their associated query fragment. Such signatures are identified and ranked according to their potential benefit by the following criteria:

1. Signatures where NumDetailed/(NumSummaryOnly+ NumDetailed)>=configurable setting whose default is 25%.
2. Signatures whose AvgAgression>=configurable threshold setting whose default is Medium Operation 350 in FIG. 4 depicts statistics advisor 307 analyzing the optimizer usage metadata for signatures S1, S2, and S3.

A subset of the ranked signatures from operation 350 are approved by the user and used to generate one or more regularly scheduled jobs whose task is to collect detailed statistics on a signature's associated query fragment. The collection is specified using a dedicated scripting language command as described in operation 370. The scheduled frequency of these collection jobs should take into account the update activity on the underlying data, most notably the completion of bulk loads. Operation 350 in FIG. 4 depicts the advisor tool 307 analyzing the optimizer usage metadata for signatures S1, S2, and S3. Operation 360 in FIG. 4 depicts the statistics advisor recommending detailed histogram statistics for signature S2 only and feeding the recommendation to a histogram collect job tool 311.

If necessary, the scripting language can be extended to support a collect statistics command whose semantics are similar to the an existing statement syntax utilized in Teradata Corporation relational database systems:

---
COLLECT STATISTICS COLUMN (<signature_project_list_expr1>),
   COLUMN(<signature_project_list_expr2), ...
ON <signature_query> ;

---

The compiled execution plan for this new command requires <signature_query> to be processed using the standard query processing techniques along with a materialization of the final result into a temporary table. Any filters involving parametric constants are removed from <signature_query> prior to materialization to make the resulting data less query dependent. Using methods already established by Teradata and other relational databases, aggregation on each <signature_project_list_expr> is performed followed by the building of a histogram summarizing the distinct values and their frequencies. The resulting histogram(s) is then stored in the same statistics repository defined in step 2 along with a recorded timestamp of the collection time. Step 370 in FIG. 4 depicts the COLLECT STATISTICS command generation on the SignatureProjectList for signature S2.

The optimizer logic described in operation 332 can be extended to check for the availability of histogram statistics in those estimation cases where they are preferred over query-collected statistics or when the age of the histogram statistics is newer than the associated query collected statistics. Operation 380 in FIG. 4 depicts the Query Optimizer searching the histogram statistics stored in the repository looking for those whose associated signature matches the current subtree that is being costed.

Significant advantages can be realized including, for example, allowing for the collection of complex statistics structures, such as histograms which are often required for accurate optimizer selectivity estimates. As another example, by separating the statistics collection process from the queries that use them, it is possible to independently and proactively schedule refreshing of the statistics based on update activity levels. As yet another example, a hybrid solution can work alongside the existing query-only collection methods and retain at least one or more of its benefits.

What is claimed is:

1. A method for generating and executing queries in a distributed query processing system, the method comprising:
    receiving a query for execution by said distributed query processing system;
    generating by a query optimizer a query plan as an execution plan for said execution of said query by said distributed query processing system;
    selecting and instrumenting said query plan to collect statistics for one or more signatures;
    executing by said distributed query processing system said received query in accordance with said generated query plan;
    collecting statistics corresponding to said query plan said statistics including optimizer usage metadata corresponding to said query plan and said prior executed query plans;
    storing said collected statistics in said a repository of statistics related to prior executed query plans executed by said distributed query processing system;
    enhancing statistics related to data stored for said one or more signatures to maintain the following metadata and counts: (i) a number of optimizer usages that required only query collected statistics, and (ii) a number of optimizer usages that would have used detailed histograms had they been available along with the set of expressions or columns whose value distribution were needed;
    mining said metadata and generating a collection of histogram statistics and storing said histogram statistics in said repository;
    wherein, in generating said query plan, said query optimizer searches said statistics repository for statistics useful to the generation of said query plan, including said optimizer usage metadata corresponding to said query plan and said prior executed query plans, and based on said searching of said statistics repository, selects statistics from said repository for use in said generating of said query plan.

2. The method for generating and executing queries in a distributed query processing system in accordance with claim 1, wherein said metadata comprises information regarding the use of said statistics by said query optimizer.

3. The method for generating and executing queries in a distributed query processing system in accordance with claim 1, wherein said statistics advisory tool operates periodically to mine said metadata, generate said collection of histogram statistics, and store said histogram statistics in said repository.

4. The method for generating and executing queries in a distributed query processing system in accordance with claim 1, wherein said histogram statistics are ranked according to their potential benefit in generating query plans.

5. The method for generating and executing queries in a distributed query processing system in accordance with claim 1, wherein said query optimizer evaluates the age of said statistics when selecting statistics from said repository for use in generating said query plan.

6. The method for generating and executing queries in a distributed query processing system in accordance with claim 1, wherein said method further comprises:
    considering an average level of aggressiveness for the execution of one or more algorithms being considered as a relevant plan subtree of said query plan, wherein an aggressive execution algorithm is significantly more efficient but only in cases where input data has properties within a relatively very narrow range.

7. The method for generating and executing queries in a distributed query processing system in accordance with claim 6, wherein one or more join and aggregation algorithms are considered significantly more efficient only when an input is small enough to fit entirely within a memory of said distributed query processing system.

8. A device that includes one or more processors configured to provide a distributed query processing system, wherein the distributed query processing system comprises:
    a query optimizer for receiving a query and generating a query plan for execution of said query by said distributed query processing system, and selecting and instrumenting said query plan to collect statistics for one or more signatures;
    a repository including statistics related to prior executed query plans;
    a plan execution engine for receiving said query plan, executing said query in accordance with said query plan, collecting statistics corresponding to said query plan, and storing said statistics in said repository, said statistics including optimizer usage metadata corresponding to said query plan and said prior executed query plans; enhancing statistics related to data stored for said one or more signatures to maintain the following metadata and counts: (i) a number of optimizer usages that required only query collected statistics, and (ii) a number of optimizer usages that would have used detailed histograms had they been available along with the set of expressions or columns whose value distribution were needed;
    a statistics advisory tool for mining said metadata and generating a collection of histogram statistics and storing said histogram statistics in said repository; wherein, in generating said query plan, said query optimizer searches said statistics repository for statistics, including said historical statistics, useful to the generation of said query plan and selects statistics from said repository for use in generating said query plan.

9. The distributed query processing system in accordance with claim 8, wherein said metadata comprises information regarding the use of said statistics by said query optimizer.

10. The distributed query processing system in accordance with claim 8, wherein said statistics advisory tool operates periodically to mine said metadata, generate said collection of histogram statistics, and store said histogram statistics in said repository.

11. The distributed query processing system in accordance with claim 8, wherein said histogram statistics are ranked according to their potential benefit in generating query plans.

12. The distributed query processing system in accordance with claim 8, wherein said query optimizer evaluates the age of said statistics when selecting statistics from said repository for use in generating said query plan.

13. A non-transitory computer readable medium storing at least executable computer code for generating and executing queries in a distributed query processing system, wherein when executes that executable computer code:
- receives a query and generates by a query optimizer a query plan for execution of said query by said distributed query processing system;
- maintains a repository of statistics related to prior executed query plans;
- selects and instruments said query plan to collect statistics for one or more signatures;
- executes said query in accordance with said query plan;
- collects statistics corresponding to said query plan; and
- stores said statistics in said repository, said statistics including optimizer usage metadata corresponding to said query plan and said prior executed query plans; enhancing statistics related to data stored for said one or more signatures to maintain the following metadata and counts: (i) a number of optimizer usages that required only query collected statistics, and (ii) a number of optimizer usages that would have used detailed histograms had they been available along with the set of expressions or columns whose value distribution were needed; and mines said metadata and generates a collection of histogram statistics and storing said histogram statistics in said repository;

wherein, in generating said query plan, said query optimizer searches said statistics repository for statistics useful to the generation of said query plan, including said optimizer usage metadata corresponding to said query plan and said prior executed query plans, and based on said searching of said statistics repository, selects statistics from said repository for use in generating said query plan.

14. The non-transitory computer readable medium of claim 13, wherein said metadata comprises information regarding the use of said statistics by said query optimizer.

15. The non-transitory computer readable medium of claim 13, wherein said statistics advisory tool operates periodically to mine said metadata, generate said collection of histogram statistics, and store said histogram statistics in said repository.

16. The non-transitory computer readable medium of claim 13, wherein said histogram statistics are ranked according to their potential benefit in generating query plans.

17. The non-transitory computer readable medium of claim 13, wherein said query optimizer evaluates the age of said statistics when selecting statistics from said repository for use in generating said query plan.

18. The method for generating and executing queries in a distributed query processing system in accordance with claim 1, wherein said method further comprises:
- identifying and counting how the query time collected statistics are used by said optimizer.

* * * * *